United States Patent Office 3,816,573
Patented June 11, 1974

3,816,573
LAMINATED SKI HAVING CELLULAR PLASTIC CORE AND METHOD FOR PRODUCING THE SAME
Osamu Hashimoto and Yoshikazu Takabayashi, Hamamatsu, Japan, assignors to Nippon Gukki Seizo Kabushiki Kaisha, Hamamatsu, Japan
Original application Nov. 13, 1970, Ser. No. 89,403, now abandoned. Divided and this application Mar. 6, 1972, Ser. No. 231,958
Int. Cl. A63c 5/04, 5/12
U.S. Cl. 264—45                8 Claims

ABSTRACT OF THE DISCLOSURE

A ski core is made of cellular plastic material such as polyurethane foam having a specific gravity ranging from 0.4 to 0.7. For the production of the core, a mold is used which has a cavity substantially coinciding with the contour of the core. Ski top and bottom plates and/or side plates, as well as an H-shaped spacer interposed therebetween, may be positioned in the cavity before the foamable plastics is poured in the cavity so that the plates may be bonded to the core within the cavity at the same time when the core is produced. The H-shaped spacer is embedded in the core, serving as a reinforcement for the core.

This a a division of application Ser. No. 89,403, filed Nov. 13, 1970, now abandoned.

BACKGROUND OF THE INVENTION

This invention relates to a laminated ski including a cellular plastic layer as its core and to a method for producing the ski of such a kind.

Heretofore, a laminated ski has been produced employing a wooden core material of uniform quality which is at the first step of the production formed into the size and shape adapted to the ski to be produced, applied with a bonding agent on the upper and lower surfaces thereof, desired surface plates being placed on the upper and lower surfaces of the core material, and heat treated for firmly bonding the surface plates to the core material. The thus bonded ski blank is then trimmed excessively extending edges of the surface plates, and then side surface plates are applied in the same manner as described above. Since the production of the conventional laminated ski requires much time and skilled labor, the production efficiency of the conventional laminated ski has been very low. Furthermore, wood resource for the fine grain and uniform quality core material are becoming more and more scarce and the cost for the wood core material is constantly getting higher.

Several alternative constructions of the laminated ski for substituting the wood core material by a treated lower quality wood or by a synthetic resin have been proposed. However, some of the proposed constructions employing a cheaper material as described above had not sufficient toughness and resilience as required, and some other constructions employing synthetic resin were too heavy, and so far as we are aware, none of the heretofore proposed ski constructions has succeeded in providing all of the requirements for the ski.

SUMMARY OF THE INVENTION

Therefore, the primary object of the present invention is to provide an improved construction of the laminated ski whereby all of the above described drawbacks can be substantially eliminated.

Another object of the invention is to provide an improved construction of ski whereby all of the requirements posed on the ski are substantially fulfilled.

Still another object of the invention is to provide an improved construction of the laminated ski wherein the material cost for the core material is considerably reduced.

A further object of the present invention is to provide an improved method for producing the ski wherein the production processes are substantially simplified.

These and other objects of the present invention can be achieved by an improved construction of the ski wherein the core is made of a cellular plastic material having a specific gravity ranging from 0.4 to 0.7.

The above described objects of the present invention can also be achieved by an improved method for producing the laminated ski, wherein the core of the above described cellular plastic material is molded in a metal mold together with the side plates of the ski beforehand placed in the mold.

Alternatively, the core may be molded together with an upper plate and a lower plate and/or the side plates of the ski, all of the plates being beforehand placed in the metal mold with a supporting member or spacer for holding these plates in their required positions, and the supporting member is left to be included in the core after the foamable resin is foamed and solidified.

It should be noted that the core thus molded may be thereafter bonded with an upper surface plate of a laminated construction including a top decorative plate and side edges consisting of a metal, and also with a lower surface plate also of a laminated construction including a sole plate and edges, or in some particular cases, the above described upper and lower surface plates inclusive of their edges may be altogether placed in the corresponding positions in the mold together with a supporting member or spacer holding these plates in their positions, and then the foamable resin may be poured into the mold to be foamed and solidified.

The invention will be better understood from the following detailed description of the invention when read in conjunction with the accompanying drawings wherein like parts or members are designated by like reference numerals.

DETAILED DESCRIPTION OF THE INVENTION

Figure 1:
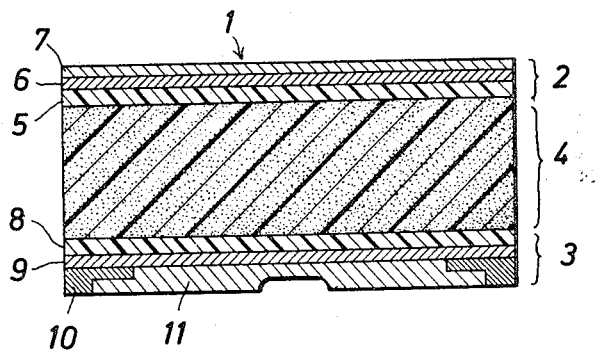
FIG. 1 is a cross-sectional view showing a fundamental construction of the laminated ski according to the present invention.

Referring now to FIG. 1 showing a basic construction of the laminated ski according to one embodiment of the present invention, it is seen that the main body 1 of the laminated ski comprises an upper section 2, a lower section 3, and an intermediately disposed core 4. The upper section 2 is further composed of a glass fiber reinforced plastic plate 5 directly contacting with the core 4, an aluminum alloy plate 6, and a top decorative plate 7. The lower section 3 comprises a glass fiber reinforced plastic plate 8 directly contacting with the lower surface of the core 3, an aluminum alloy plate 9, steel edges 10, and a sole plate 11.

These upper and lower sections 2 and 3 are fixedly secured to the core 4 by means of, for instance, bonding material, machine screws, or rivets.

The core 4 is made of a cellular plastic material such as polyurethane foam having a specific gravity of from 0.4 to 0.7. Various tests have found that the core with a specific gravity of less than 0.4 deteriorates in the durability and the holding power given to the screw bolts fastening a binding attachment to the ski, and that the core with a specific gravity of more than 0.7 results in a substantial increase of the weight of the whole ski, making the ski operation very difficult.

It is further found that the cellular plastic material is preferred to be so foamed that it has cells most of which are closed or not inter-communicating.

The closed cells will strengthen the structure of the core. In this example of the laminated ski, the core 4 also fulfills the function of the side plates, that is, it constitutes the outer side surfaces of the ski, and hence no separate side plates are provided therewith.

Since the core 4 made of cellular plastic material has an excellent machinability, formation of the necessary and desired camber of the ski, which is the most difficult step in the production of the ski, can be carried out far easier than the conventional wood core material. Furthermore, since the core is also acting as the side plates, there is no necessity of further bonding other side plates on the core. For these reasons, the production efficiency of the laminated ski can be elevated and the cost of the products can be much reduced.

Figure 2:
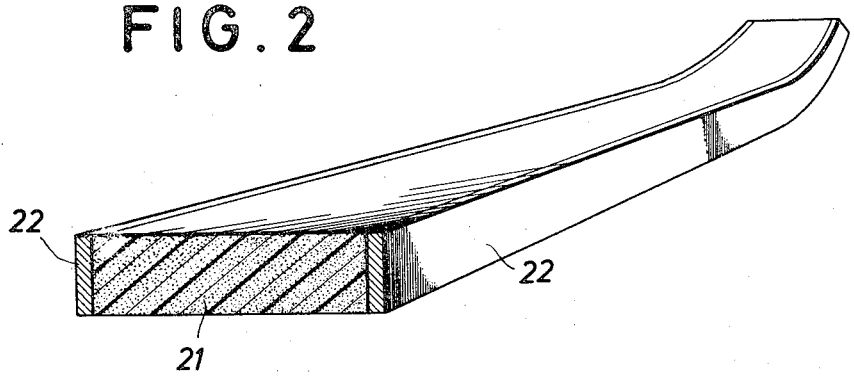
FIG. 2 is a perspective view, partly in section, of a combination of a core and side plates which is employed in the production of the laminated ski according to the present invention.

Referring next to FIG. 2 showing an other example of core material employed in constructing a laminated ski according to the present invention, there are indicated a core 21 of a cellular plastic material and side plates 22 bonded on both side surfaces of the core 21.

Figure 3:
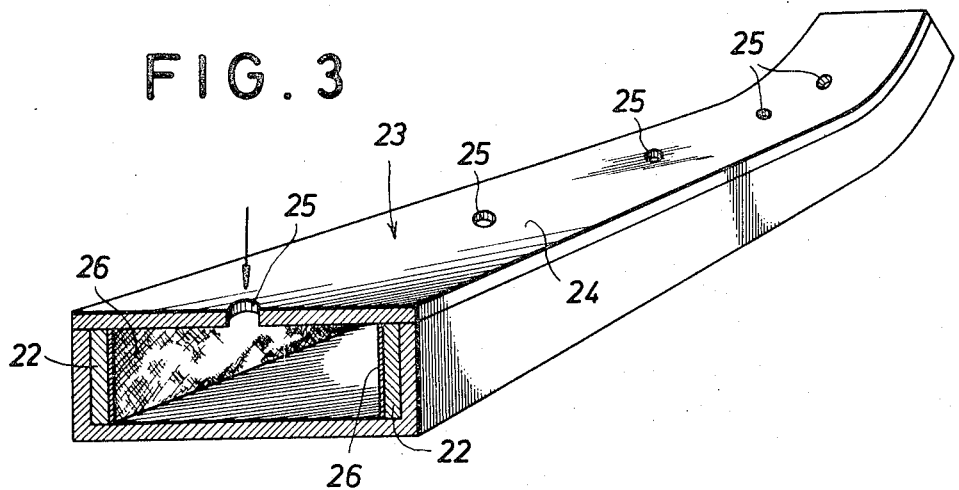
FIG. 3 is a perspective view, partly in section, of a metal mold which is employed for molding the core material shown in FIG. 2.

FIG. 3 indicates a mold employed for casting the above described core and simultaneously bonding the side plates to the core. The metal mold 23 has a top cover 24 in which a required number of filling ports 25 for the liquid resin are provided. The configuration of the cavity formed in the metal mold 23 coincides with the contour of the core inclusive of the side plates, and the structure of the metal mold 23 and cover 24 is so designed as to withstand the filling and foaming pressures of the resin.

The method for producing the core inclusive of the side plates, which constitutes a second embodiment of the present invention, is as follows.

At first, the side plates 22 are placed in the cavity of the mold 23 along the inside surfaces thereof. The side plates 22 may consist of ABS (acrylonitrile-butadiene-styrene) resin plate, phenol resin plate or the like, and in this example, the side plates 22 of a phenol resin impregnated hardened sheet having about 1.0 mm. thickness are employed. On the side of each side plate 22 facing the cavity of the metal mold 23, a sheet of glass cloth 26 (or glass mat, or other kind of cloth or mat may be used) is attached. After the mold 23 is sealed with the mold cover 24, foamable resinous materials are poured as liquid through the filling ports 25 of the cover 24 into the cavity of the metal mold 23. The foamable resinous materials may be foamable urethane resin, ABS resin, and the like, and in this example, foamable urethane resin is employed. After the completion of the filling operation, all of the filling ports 25 are closed and the urethane resin is foamed so that it exhibits a specific gravity of from 0.4 to 0.7. Under the foaming pressure of the urethane resin, the side plates 22 are pressed closely onto the internal surfaces of the molding cavity, with the result that the contour of the combined core and side plates precisely coincides with the shape of the mold cavity and that the bonding between the side plates 22 and the polyurethane foam core 21 is found to be sufficiently strong.

The core thus molded is thereafter bonded with an upper surface plate, top decorative plate, sole plate, or the like, top-edges and steel edges, and other attachments for ski are mounted following the conventional manner.

With this construction, the bonding and trimming steps of the side plates can be eliminated, and the rigidity, vibration absorbing nature, flexibility, or other required characteristics are substantially equivalent to those for the ski having the conventional wood core material.

Figure 4:
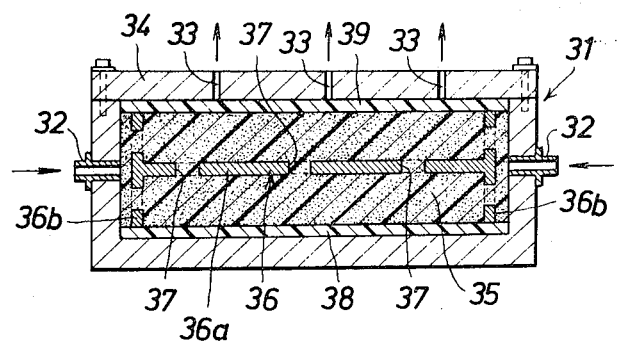
FIG. 4 is a cross-sectional view of another type of mold wherein a core having upper and lower plates as well as the side plates inclusive of a supporting member is to be molded.
Figure 5:
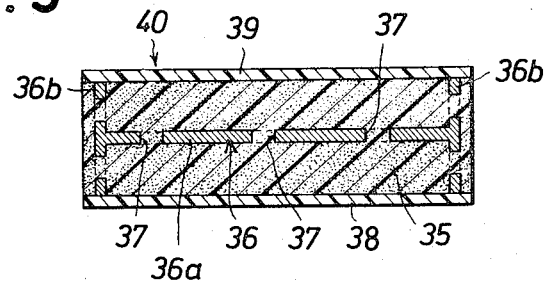
FIG. 5 is a cross-sectional view of the core produced in the mold shown in FIG. 4.

In FIG. 4, there is indicated another method of forming a core and simultaneously bonding thereto an upper plate and a lower plate and/or both side plates, thus eliminating the separate bonding steps of these plates. In this method, the upper and lower plates and/or both side plates are pressed closely onto the corresponding internal surfaces of the molding cavity of the metal mold 31 under the foaming pressure of the foamed resin. However, in this method, if the position of any of the upper, lower, and/or both side plates inserted in the mold cavity is not sufficiently correct, the foaming pressure will not be applied uniformly on these plates and there is a possibility of inclining these plates.

When the positions of these plates are not correct, a part of the foamable resinous material poured in the mold cavity tends to intrude between these incorrectly placed plates and the inner surfaces of the metal mold so that these plates are buried under the foamed resin in the resultant product of the core.

This drawback is eliminated by the provision of a supporting member or spacer placed inside of these plates. By means of the spacer, both side plates and/or the upper and the lower plates are held in their positions as shown in FIG. 4.

More specifically, the metal mold 31 employed in this case is provided with a plurality of inlet ports 32 spaced apart at a suitable distance for filling foamable resinous materials. On the other hand, a plurality of exhaust ports 33 are provided in the top cover 34 of the mold 31.

A core 35 foamed inside of the mold 31 may consist of a cellular plastic such as polyurethane or ABS foam, and in this example, rigid polyurethane foam is employed. Although the rigid polyurethane foam in this instance was molded so that a specific gravity of 0.5 was obtained, the specific gravity of the cellular plastics may be varied within a range of from 0.4 to 0.7.

Figure 7:
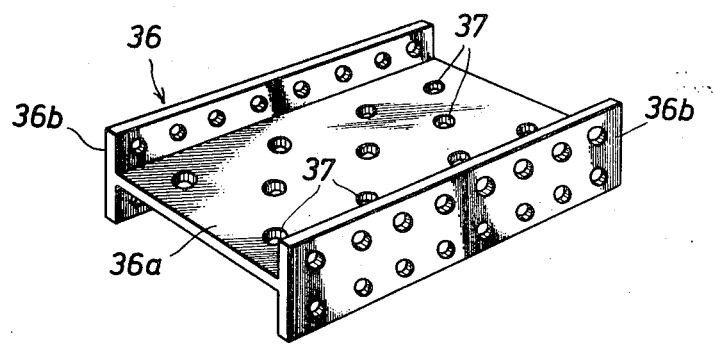
FIG. 7 is a perspective view of a supporting member or spacer employed in the core shown in FIGS. 4 through 6.
Figure 8:
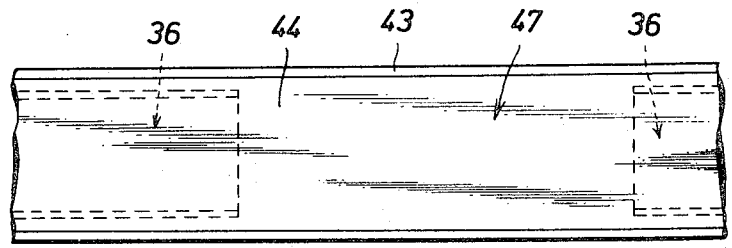
FIG. 8 is a plan view of one part of the core wherein the distribution of the supporting members is shown by the broken lines.

The spacer or supporting member 36 for supporting the upper and the lower plates and/or both side plates in their respective positions may consist of a synthetic resin such as ABS, a light metal alloy such as aluminum, or the like, and it may be formed into H or I cross-sectional configuration of an arbitrary length along the longitudinal direction of the core. As shown in FIG. 7, the arm portions 36b and the web portion 36a of the spacer 36 are preferably provided with numerous holes for passing the foamable resinous materials. When the length of the spacer 36 is determined to be equivalent to the length of the core, that is, when one continuous spacer 36 is employed in the core material, the web portion 36a of the spacer 36 is necessarily bored to provide a suitable number of holes 37, 37 . . . for communicating the above described two spaces in the molding cavity. When a plurality of spacers 36 are provided along the longitudinal direction of the core, the spacers 36 are spaced apart as shown in FIG. 8 so that a better communication can be obtained between these two spaces.

Thus the method for producing the ski core, which constitutes still another embodiment of the present invention, will now be described in more detail.

Figure 6:
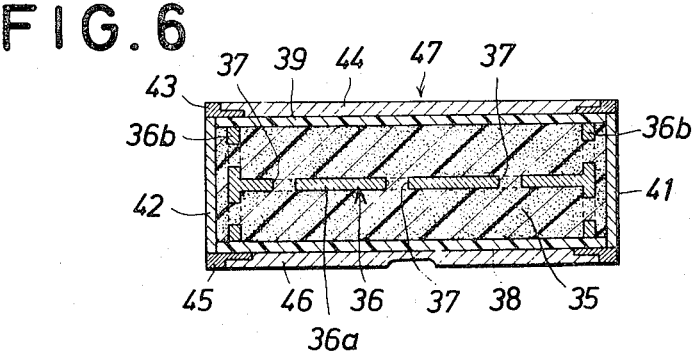
FIG. 6 is a cross-sectional view of the laminated ski completed with the employment of the core shown in FIG. 5.

On the inner bottom of the mold 31, a lower plate 38 of, for example, glass fiber reinforced plastics is placed, and on the lower plate 38, an arbitrary number of spacer or spacers 36 are placed along the length of the mold 31. Then an upper plate 39 of, for example, glass fiber reinforced plastics is placed on the spacer or spacers 36 and the metal mold 31 is rigidly closed by the top cover 34. Foamable resinous materials are thereafter filled into the mold 31 through the inlet port 32 and is foamed inside of the cavity. Under the foaming pressure of the foaming resin, the upper and lower plates 38 and 39 are pressed closely onto the inner surfaces of the upper and lower walls of the cavity, and one part of the foamable resinous materials enter into the spaces between the flanged portions 36b, 36b and the inner surfaces of the mold to be solidified therein, so that the spacer 36 is buried into the core 35 of cellular plastic material. As a result, a combination 40 of a core and upper and lower plates wherein the core 35 is rigidly bonded with the upper and lower plates 38, 39 is obtained. The combination 40 is then taken out of the metal mold 31, and side plates 41 and 42 are bonded on the corresponding side surfaces of the core 35. After the application of the side plates 41 and 42, edges 43 and a decorative top plate 44 are fixed on the upper plate 39 and other edges 45 and a sole plate 46 are attached to the lower plate 38. By this way, a laminated ski 47 as shown in FIGS. 6 and 8 can be obtained.

Although in the above described embodiment of the invention, a combination of a core and upper and lower plates is produced within the mold, almost completed laminated ski may also be produced through the steps of beforehand attaching most of the required parts on the upper plate 39 and the lower plate 38, inserting the upper and lower plates thus attached into the metal mold 31 together with the spacer 36, and filling the inside cavity of the mold 31 with the foamable resinous materials.

The laminated ski obtained through the above described method will assure a correct arrangement of the upper and lower plates because of the existence of the spacer, whereby a laminated ski of higher quality can be produced. Furthermore, the spaced buried in the core of plastics foam material can serve as a reinforcing member of the ski structure, and the less foamed so called skin layer formed on the core surface contacting the spacer can improve the durability of the core material of the ski.

Such skin layers are also formed on the outer surfaces of the core which, during molding, are in contact with the inner walls of the mold or with the surfaces of the upper and lower plates disposed therein, and it has been found that if there is formed so thick a skin layer in the skinned foam, shearing stresses are concentrated on the boundary line between the skin layer of the core and the foamed layer thereof with the result that the core is apt to be broken along this boundary line during the use of a ski employing such a core. It has been further found that the temperatures of the mold and foamable resinous materials and the curing time and temperature have much to do with the formation of the skin layer, especially the thickness of the skin layer.

As a result of various experiments, desirable skin foams or so-called integral skin foams in which the thickness of the skin layer is very thin were found to be obtainable under the following conditions:

Temperature of the mold before the foamable resinous materials are poured in the mold cavity.         30° C. to 70° C.
Temperature of the foamable resinous materials before molding.                                       30° C. to 70° C.
Curing temperature _____ 50° C. to 90° C.
Curing time _____ 20 minutes.

In one of the experiments in which the desirable skinned foam was obtained, we used as the foamable resinous materials polyol ("RM25A-2" sold by Kao Soap Co., Ltd., Japan) and isocyanate ("RM14B" also sold by the same company), the mixing ratio of the polyol to the isocyanate being 1.00:1.35, and thus we obtained the rigid polyurethane foam having the specific gravity of 0.6.

Talbe I shows the characteristics of the plastics foams obtained under various curing conditions.

TABLE I

| Curing conditions | | | | Characteristics of foamed Core | | | | | | |
|---|---|---|---|---|---|---|---|---|---|---|
| | | | | | | | H | | I | |
| A | B | C | D | E | F | G | a | b | a | b |
| 30 | 30 | 30 | 20 | 3.46 | 71.5 | 8.18 | 1.7 | 3.4 | 0.28 | 0.29 |
| 30 | 30 | 60 | 20 | 3.72 | 72.9 | 8.48 | 1.5 | 3.0 | 0.29 | 0.31 |
| 40 | 40 | 40 | 20 | 3.64 | 71.6 | 8.91 | 1.5 | 2.5 | 0.27 | 0.32 |
| 40 | 40 | 70 | 20 | 3.84 | 68.7 | 9.69 | 1.6 | 2.6 | 0.36 | 0.36 |
| 50 | 50 | 50 | 20 | 3.78 | 71.6 | 11.00 | 1.5 | 2.2 | 0.30 | 0.36 |
| 50 | 50 | 80 | 20 | 3.92 | 69.9 | 11.90 | 1.0 | 2.0 | 0.33 | 0.34 |
| 60 | 60 | 60 | 20 | 3.92 | 70.1 | 13.20 | 1.3 | 1.6 | 0.33 | 0.38 |
| 60 | 60 | 90 | 20 | 4.10 | 71.7 | 13.70 | 1.1 | 1.8 | 0.38 | 0.43 |
| 70 | 70 | 70 | 20 | 3.85 | 68.8 | 9.70 | 1.5 | 2.5 | 0.35 | 0.36 |

(Note 1): In the table, A is temperature (° C.) of the mold before the foamable resinous materials are poured in the cavity of the mold; B, temperature (° C.) of the foamable resinous materials before molding; C, curing temperature (° C.); D, curing time (minutes); E, bending strength (kg./mm.$^2$) measured according to DIN 53423; F, Young's modulus (kg./mm.$^2$); G, Izod impact value (kg. cm./cm.$^2$); Ha, thickness (mm.) of skin layer formed at the upper surface of the core in contact with the upper wall of the mold cavity; Hb, thickness (mm.) of skin layer formed at the lower surface of the core in contact with the lower wall of the mold cavity; Ia, shrinkage percentage (percent) of the foamed core in the direction of foaming; and Ib, shrinkage percentage (percent) of the foamed core in the direction perpendicular to the direction of foaming.

(Note 2): In this experiment, only the foamable resinous materials were filled in the mold cavity without disposing in the mold cavity any other members such as upper, lower or side plates of the ski or spacers.

Figure 9:
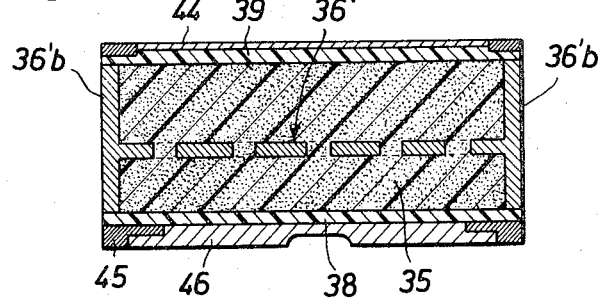
FIG. 9 is a cross-sectional view of another type of laminated ski wherein the spacer is also employed for forming the side plates.

An additional embodiment of the present invention for producing still another form of the laminated ski will now be described with reference to FIG. 9. In this type of the ski, the flanged portions 36'b, 36'b at both ends of the spacer 36' are used as the side plates of the laminated ski.

More specifically, the upper and lower plates are inserted into a metal mold of a desired shape, a spacer of an H-shaped cross-sectional configuration is also inserted between the upper plate and the lower plate for supporting the plates in a parallel relation, foamable resinous materials are filled inside of the metal mold, and then the resinous materials are foamed and cured so that a core rigidly bonded with the upper and the lower plates can be integrally formed inside of the metal mold. In this case, since the lateral width of the spacer is selected to be substantially equal to the width of the upper and lower plates, the flanged surfaces of the spacer can serve as both side plates for the laminated ski and a step of bonding the side plates onto the core can be thereby eliminated.

What is claimed is:

1. A method for producing a combination of a ski core and side plates at opposite sides of said core comprising the steps of:
    (A) preparing a mold with a cavity substantially coinciding with the combination contour of said ski core and side plates;
    (B) placing the two sides plates in the cavity of the mold at positions contiguous to and along the right and left-hand side inner surfaces of the mold, with the side plate being unsecured;
    (C) filling the mold cavity with foamable plastic materials; and
    (D) foaming and curing the thus filled plastic materials so that said two side plates are pressed closely onto both said side inner surfaces of the mold under the foaming pressure of said plastic materials and bonded integrally to the core formed into a plastic foam.

2. A method for producing a ski core as claimed in claim 1, including:
    (A) foaming and curing said foamable plastic materials under the following conditions:
        (i) temperature of the mold before the foamable plastic materials are poured in the mold cavity being from 30° C. to 70° C.;
        (ii) temperature of the foamable plastic materials before molding being from 30° C. to 70° C.;
        (iii) curing temperature being from 50° C. to 90° C. at which temperature the foamable plastic materials foam; and
        (iv) curing time being about 20 minutes.

3. A method for producing a laminated ski comprising the steps of:
    (A) preparing a mold with a cavity substantially coinciding with the contour of said ski;
    (B) placing a pair of right and left side plates for said ski inside said mold with the side plates being unsecured;
    (C) filling the space in the mold cavity formed between the pair of side plates with foamable plastic materials;
    (D) foaming and curing the thus filled plastic materials so that the side plates are pressed closely onto the corresponding inner surfaces of the mold under the foaming pressure of said plastic materials and are bonded integrally to the core formed into a plastics foam.

4. A method for producing a laminated ski comprising the steps of:
    (A) preparing a mold with a cavity substantially coinciding with the contour of said ski;
    (B) inserting a pair of upper and lower plates for said ski inside said mold with the upper and lower plates being unsecured;
    (C) filling the space in the mold cavity formed between said upper and lower plates with foamable plastic materials;
    (D) foaming and curing the thus filled plastic materials so that the upper and lower plates are pressed closely onto the corresponding inner surfaces of the mold under the foaming pressure of said plastic materials and are bonded integrally to the core formed into a plastics foam.

5. A method as claimed in claim 4 and further including inserting a pair of unsecured right and left side plates for said ski inside said mold and filling the space in the mold cavity formed between said pair of said plates and said upper and lower plates so that all the plates are pressed closely onto the corresponding inner surfaces of the mold and bonded integrally to the core formed into a plastics foam.

6. A method for producing a laminated ski comprising the steps of:
    (A) preparing a mold with a cavity substantially coinciding with the contour of said ski;
    (B) inserting a pair of upper and lower plates inside of said mold, with the upper and lower plates being unsecured;
    (C) interposing a spacer between said plates so as to support said upper and lower plates, respectively, in parallel;
    (D) filling the mold cavity with foamable plastic materials; and
    (E) foaming and solidifying the plastic materials to form a core wherein said plates and said spacer are bonded together in an integral manner with the plates being pressed closely onto corresponding inner surfaces of the mold under the foaming pressure of said plastic materials.

7. A method for producing a laminated ski as claimed in claim 6 and including inserting a pair of unsecured right and left side plates inside of said mold with the interposed spacer supporting all said plates and wherein all said plates and said spacer are bonded together in an integral manner.

8. A method for producing a laminated ski as claimed in claim 6 wherein said spacer is approximately H-shaped in cross section so as to support said upper and lower plates in parallel and both side surfaces of said spacer are utilized as both side plates of said ski.

References Cited

UNITED STATES PATENTS

| | | | |
|---|---|---|---|
| 3,503,621 | 3/1970 | Schmidt et al. | 280—11.13 L |
| 3,635,482 | 1/1972 | Holman | 280—11.13 L |
| 3,272,522 | 9/1966 | Kennedy | 280—11.13 L |

FOREIGN PATENTS

| | | | |
|---|---|---|---|
| 1,403,059 | 5/1965 | France | 280—11.13 L |
| | | (Addition to No. 1,423,868) | |
| 87,478 | 7/1966 | France | 280—11.1 L |
| 46/7,470 | 2/1971 | Japan | 264—45 |

DONALD E. CZAJA, Primary Examiner

R. W. GRIFFIN, Assistant Examiner

U.S. Cl. X.R.

280—11.13 L, 11.13 M

UNITED STATES PATENT OFFICE
CERTIFICATE OF CORRECTION

Patent No. 3,816,573          Dated June 11, 1974

Inventor(s) Osamu Hashimoto and Yoshikazu Takabayashi

It is certified that error appears in the above-identified patent and that said Letters Patent are hereby corrected as shown below:

On column 1, line 6, "Gukki" should read --Gakki--.

Signed and sealed this 8th day of October 1974.

(SEAL)
Attest:

McCOY M. GIBSON JR.          C. MARSHALL DANN
Attesting Officer             Commissioner of Patents